(12) United States Patent
Midde Peddanna

(10) Patent No.: US 6,609,084 B2
(45) Date of Patent: Aug. 19, 2003

(54) DATA TRANSFER PERFORMANCE MEASURING SYSTEM AND METHOD

(75) Inventor: Shashijeevan Midde Peddanna, Hyderabad (IN)

(73) Assignee: Hewlett-Packard Development Company, LP., Houston, TX (US)

(*) Notice: Subject to any disclaimer, the term of this patent is extended or adjusted under 35 U.S.C. 154(b) by 32 days.

(21) Appl. No.: 09/927,138

(22) Filed: Aug. 10, 2001

(65) Prior Publication Data

US 2003/0033118 A1 Feb. 13, 2003

(51) Int. Cl.$^7$ ................................................ G06F 11/30
(52) U.S. Cl. .................. 702/186; 702/119; 702/122; 717/155; 717/165; 717/167; 709/224; 709/220; 709/223; 705/7; 705/40
(58) Field of Search ............................. 702/119, 122, 702/123, 179, 182.183, 186–188, FOR 103, 104, 134, 135, 139, 170, 171; 709/224, 220, 221, 223; 717/151, 155, 162, 165, 167, 171; 705/7, 40

(56) References Cited

U.S. PATENT DOCUMENTS 6,442,620 B1 * 8/2002 Thatte et al. ............... 709/316
2001/0056362 A1 * 12/2001 Hanagan et al. ............... 705/7
2002/0032769 A1 * 3/2002 Barkai et al. ............... 709/224

OTHER PUBLICATIONS

Ibbetson et al., Reducing the cost of Remote Procedure Call, Jan. 1998, IEEE, pp. 430–446.*

* cited by examiner

Primary Examiner—Hal Wachsman
Assistant Examiner—Elias Desta
(74) Attorney, Agent, or Firm—Richard Main

(57) ABSTRACT

A system is disclosed for benchmarking data transfers using different transport mechanisms between processes run on various nodes of a network. A central manager component interfaces with a user and reports benchmark results, and an agent component under control of the manager component is provided on each of the nodes. The agent components conduct the benchmarking tests under instruction from the manager component and report the results to the manager component. The manager component may enable the automatic reproduction of tests through a repository of logged scripts. The invention provides a simple to use and centralised control of testing, with measurement techniques independent of reporting. The framework is extensible to the benchmarking of new transport mechanisms, and allows testing of Inter-node transfers and Intra-node transfers through the same interface.

20 Claims, 3 Drawing Sheets

DATA TRANSFER PERFORMANCE MEASURING SYSTEM AND METHOD

FIELD OF INVENTION

The present invention relates to a performance measuring system and method which provides a framework for the measurement of data transfer between processes, and to a system and method for measuring and comparing transaction times for the transfer of data between various processes running on nodes of e.g. a distributed system using different data transport mechanisms.

BACKGROUND OF THE INVENTION

The transfer of data between processes (for example between a server and a client) can be achieved by various transport mechanisms (for example UNIX message queues, Sockets, JMS, CORBA and the like).

The actual time taken for the data transfer to take place will be an important factor in deciding the mode of transport to use.

Determining the time taken for such data transfers has generally been a laborious process, in which a tester would need to write a number of programs specific to each machine and data transfer mechanism, and would have to run the programs from each machine, and then collate and compare the results.

An object of the present invention is to provide a framework which can be used for the purposes of measuring and thereby comparing data transfer speeds and the like between processes running on the nodes of a computer network for different transport mechanisms.

SUMMARY OF INVENTION

Viewed from one aspect, the present invention provides a system for testing data transfer between a plurality of processes run on one or more nodes of a computer network, the system including a central manager component, and an agent component associated with each of the nodes, wherein the manager component instructs the agent components to conduct data transfer tests, and wherein the manager component receives the results of the tests from the agent components.

The use of a manager component, separate from a number of agent components running on the nodes, provides a number of advantages in testing.

It allows for a centralised control of the testing, with the location of the manager component independent of where the benchmarking takes place. It also allows the reporting of the results by the manager component to be independent of the various measurement techniques employed by the agent components.

It can further provide a system which is extensible and is adaptable to the testing of new transport mechanisms. It is simple to use, as the user need only interface with the manager component and a set interface structure, no matter the types of transport mechanism under test.

As the transfer mechanisms involved in the tests are abstracted in the framework provided by the system, a user need not concern themselves as to the actual implementation of the data transfers, etc., and can focus on the tests required and can analyse the results centrally through the manager component.

Preferably, the manager component is remote from the nodes and runs on a separate machine, so as not to interfere with the load put on the nodes under test.

Preferably, the manager component passes parameters to the agent components, and the agent components create and initialise processes for carrying out the required data transfers. The data transfer may be carried out between pairs of processes, e.g. between a client process and a server process.

The parameters passed from the manager component to the agents may indicate a role for the processes which an agent component is to create, e.g. a client or server role, and may indicate the type of transfer mechanism to use, e.g. Sockets. They may also include parameters specific to the communication type to be employed, e.g. a hostname and port number, and parameters specific to the measurement, e.g. the number of loops to make and/or the message length.

An agent component may verify these parameters (e.g. to check that a port specified by the manager component is free), and may then create and initialise the necessary processes for carrying out a test. The manager component may also synchronise the starting of the tests between the various processes. For example, the processes at an agent may block on an object, such as a single mutex. The agents may then be notified by the manager component as to when management is to be started, and will accordingly update the mutex so that the processes will start to exchange messages.

Once the processes have exchanged data, the agent components can determine the benchmarking results. The agent components may then send the results back to the manager component automatically, or the manager component may poll the agent components for the results.

On receiving the results of the tests from the agent components, the manager component may calculate metrics for the data transfer mechanisms (e.g. the total bytes exchanged per second), which may then be displayed or otherwise communicated to the user.

The manager component may also instruct agent components to abort a test, if this should be required for any reason, e.g. in order to execute the test at a later time or because an error has been detected.

The transport mechanisms which may be tested may include various messaging middleware, and may include transport mechanisms such as UNIX messaging queues, Sockets, RPCs (Remote Procedure Calls), CORBA (Common Object Request Broker Architecture), and JMS (Java Messaging Service).

The manager and agent components may be implemented in any suitable form, depending on the machines and languages used, as would be well understood by a man skilled in the art in the light of the present teachings.

The processes created by the agents will depend on the messaging types and the agents. For example, if the messaging type is Sockets, and the agent is JAVA based, then the processes may be JAVA threads.

The tests may be between processes running on different nodes (hereinafter referred to as "Inter-mode" tests) or may be between processes running on the same node (hereinafter referred to as "Intra-mode" tests). They may also be carried out using a mixture of both Inter and Intra-mode tests. By having the manager component removed from the testing procedure, a user of the system can use the same interface (through the manager component) for both Inter- and Intra-mode testing.

The Inter-mode and Intra-mode testing is made possible with the same interface because of the separation of the benchmarking interface from implementation. For each communication type the benchmarking interface is implemented and made accessible at all the agents. This way the framework is extensible for other communication types also.

The manager component may communicate with the agent components in any suitable manner, and, in one embodiment, communication may take place using CORBA. Thus, the agent components may register with the CORBA naming service using unique names that are also known to the manager component, and the manager component will use these names to locate the agent components through the CORBA naming service. The use of CORBA allows the agent components to be placed on nodes anywhere on the network.

Preferably, the manager component includes a repository for storing scripts of test parameters and the like. This allows for the re-running of tests, and the automated reproduction of results.

The manager component may have a user interface which enables a user to select the mechanism of transfer to be tested, the mode of the transfer (i.e. Inter or Intra-mode), the number of sets of processes, and the number of data transfers.

The present invention also extends to methods of testing data transfer between processes running on one or more nodes of a network in accordance with the above features, and to software and hardware for implementing the same.

BRIEF DESCRIPTION OF DRAWINGS

The present invention will hereinafter be described in greater detail by reference to the attached drawings which show an example form of the invention. It is to be understood that the particularity of the drawings does not supersede the generality of the preceding description of the invention.

DETAILED DESCRIPTION

Figure 1:
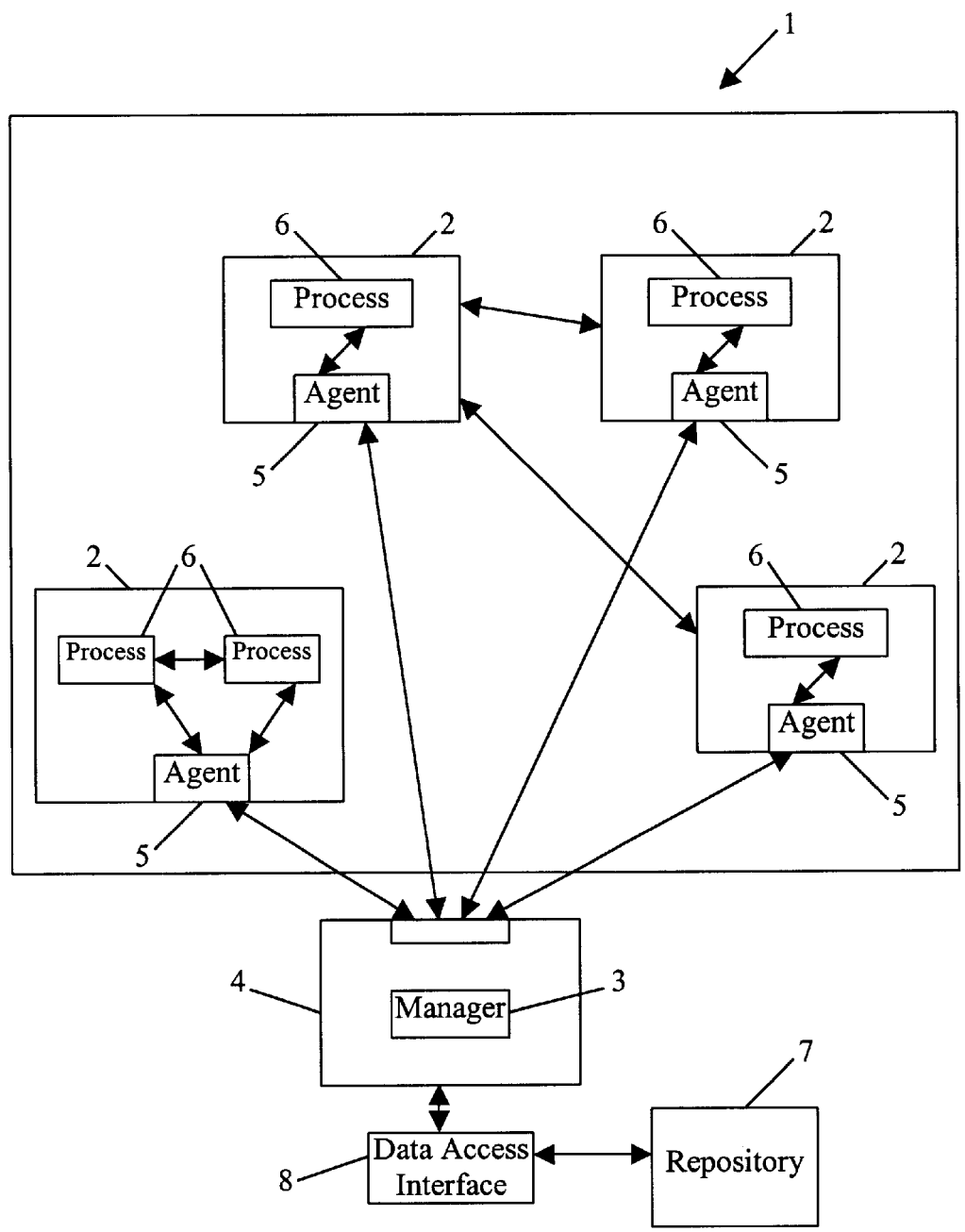
FIG. 1 is a schematic diagram of an architecture of a performance measuring system in accordance with one embodiment of the present invention.

Referring to FIG. 1, a network 1 comprises a plurality of nodes 2 which may communicate with one another. The nodes 2 may for example comprise UNIX machines, and may communicate with one another through various data transfer mechanisms, such as UNIX messaging queues, Sockets, RPCs (remote procedure calls), CORBA (Common Object Request Broker Architecture), or JMS (Java Messaging Service).

The present invention provides a framework for testing the speed of data transfer over the various data transfer mechanisms. This allows a user of the tool to calculate the best transfer mechanism for a given set of parameters or to identify and measure the times for one or more given transfer mechanisms.

The framework comprises a central manager component 3, which runs on a separate machine 4 from those of the system 1 and which controls a plurality of agent components 5, one of which is provided on each of the nodes 2. In order to conduct the tests, the agent components 5 create processes 6 which transfer data between one another using the data transfer mechanisms under test.

Tests may be carried out on data transfers taking place between processes 6 running on different nodes (Inter-mode transfers), or on data transfers taking place between processes 6 on the same node (Intra-mode transfers—see the node 2 in the lower left-hand corner of the network 1). Tests may also be carried out using both Inter and Intra-mode transfers. In the case of Intra-mode transfers, the processes transferring the data will be created by the same agent.

In order to conduct a test, a user interfaces with the manager component 3 through a user interface which may be for example text-based. The user instructs the manager component 3 as to the test to be carried out, and the manager component 3 instructs the agent components 5 accordingly.

As well as receiving instructions for a test direct from the user, the manager component 3 is also able to access a repository 7 of scripts through a data access interface 8. The repository 7 stores scripts of tests, and allows for the automated reproduction of results through the running of the scripts by the manager component 3. The manager component 3 may automatically record test procedures for replay at a later time.

Figure 2:
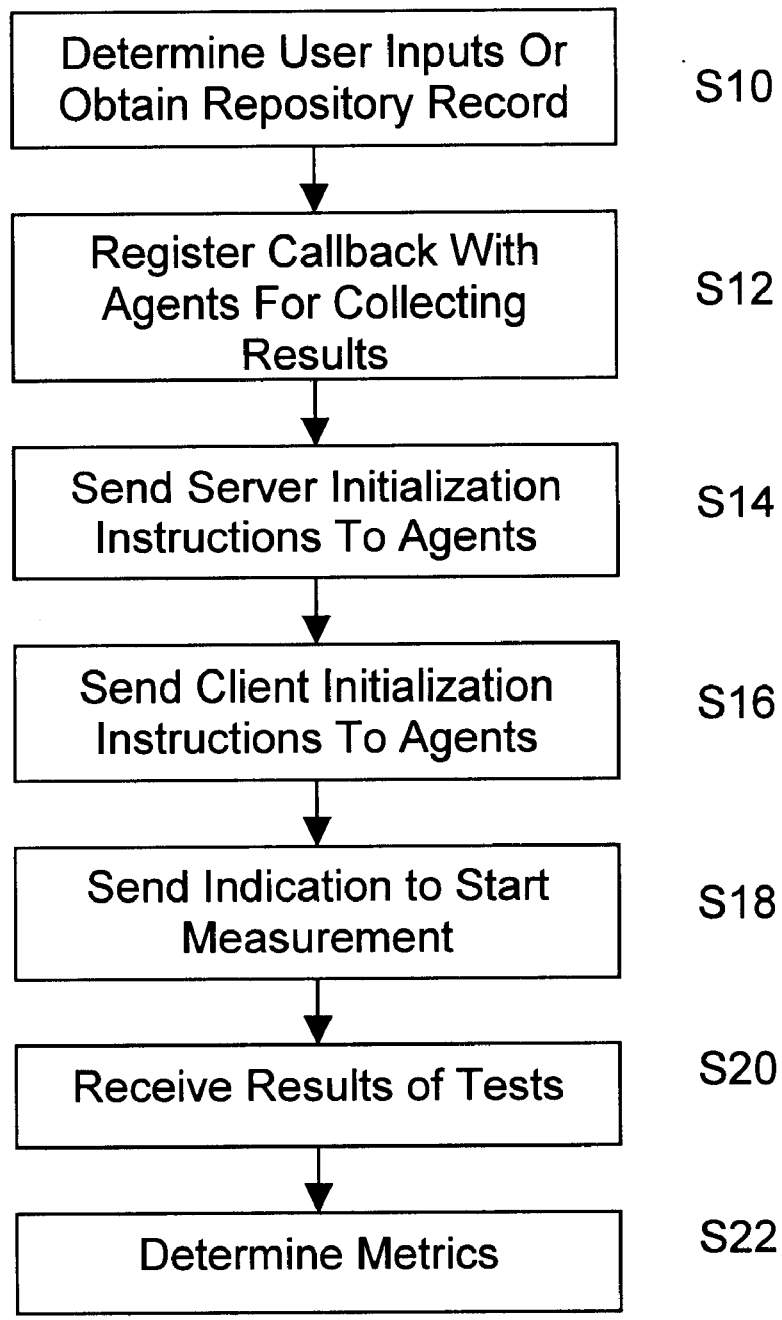
FIG. 2 is a flow diagram of the test procedure carried out by the manager component of the system of FIG. 1.

FIG. 2 is a flowchart of the procedures carried out by the manager component 3. At step S10, the manager component 3 receives user input regarding the tests to be conducted, which may include the running of a script from the repository 7. Based on this information, the manager component 3 will send initialisation instructions to the relevant agent components 5 in the form of a set of parameters.

The manager component 3 locates the agent components 5 and registers a callback with the agent components 5 as step S12, which is later used by the agent components 5 to inform the manager component 3 about the results of measurement.

At step S14, the manager component 3 instructs the agent components 5 to start the server processes. Next, as step S16, the manager component 3 instructs the agent components 5 to start the client processes.

The manager 3 may communicate with the agents 5 in any suitable manner, and, in one embodiment, communication takes place using CORBA. Thus, the agents 5 register with the CORBA naming service using unique names that are also known to the manager 3, and the manager 3 uses these names to locate the agents 5 through the CORBA naming service. The use of CORBA allows the agents 5 to be placed anywhere on the network 1.

In one embodiment, the parameters passed from the manager 3 to the agents 5 include:

1) Role parameters—The agent components 5 use these parameters when creating a process 6. They indicate the role that the process is to play, e.g. a client or server role, and the transfer mechanism that is to be used to transfer data, e.g. Sockets.

2) Communication parameters—These parameters are used for initialization, and may comprise, e.g. a host name and a port number on which a process has to listen. These parameters will be specific to the transfer mechanism employed.

3) Benchmarking parameters—These parameters relate to the magnitude of the measurement to be conducted, and may for example indicate the number of messages to be exchanged and/or the size of each message.

As an example, the parameters sent from the manager component 3 to an agent component 5 may take the form:
role=SERVER&type=SOCKETS&host=shashim1&port=10902&buffersize=1024&numberofloops=100
role=CLIENT&type=SOCKETS&host=shashim1&port=10902 &buffersize=1024&numberofloops=100

These parameters would instruct a single agent component 5 to create two processes 6, i.e. a server process and a client process.

The parameters "role=SERVER&type=SOCKETS" instruct the agent component 5 to create a server process 6 which is to use Sockets as the communications type. The parameters "role=CLIENT&type=SOCKETS" is a similar instruction, but results in the creation of a client process.

The parameters "host=shashim1&port=10902" indicate that the created process 6 should listen on port 10902 and that the host name is "shashim1".

The parameters "buffersize=1024&numberofloops=100" indicate that the number of messages to be exchanged are 100 and that the size of each message is 1024 bytes.

Once the parameters have been sent, the manager component 3 synchronises the test data transfers by sending instructions to the agent components 5 to begin the measurement at step S18. This step is separated from the server and client initialization as the various nodes can take varying amounts of time to initialize the processes, but the measurement has to start at the same time on all of the nodes. Also, this step can only be performed if the steps S14 and S16 are successful.

The signal for starting the measurement may take any suitable form, and may be implemented in different ways depending upon the programming language used. For example, where the agent component 5 is written in JAVA, the agent component 5 may create an Object, e.g. a mutex, on which all of the created processes 6 on that agent's node will wait. When the agent 5 receives a signal from the manager 3 to start measurements, the agent 5 will notify on the Object, which will allow the blocked processes to start work (the measurement).

Once the measurements are finished, the agents 5 send the results back to the manager 3. This is achieved through the callback object registered at step S12 that will be called by the agent components 5 when the measurement is complete. The manager 3 receives the results at step S20, and calculates the appropriate metric or the like at step S22. This result can then be displayed to the user, and/or further processed in combination with other test results, e.g. for comparison purposes.

Figure 3:
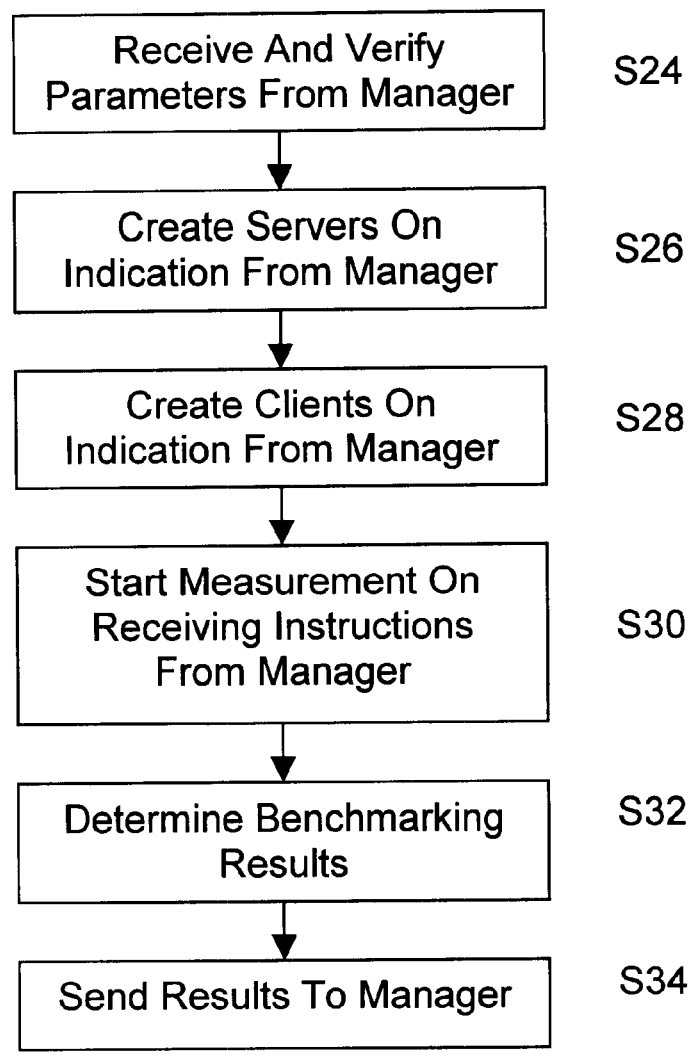
FIG. 3 is a flow diagram of the test procedure carried out by an agent component of the system of FIG. 1.

The agent procedure is shown in the flowchart of FIG. 3. At step 24, an agent 5 receives the various initialization parameters from the manager 3. It then verifies that these parameters are correct, and creates and initializes one or more processes 6 in accordance with the parameters at step S26 and step S28. The agent 5 is programmed with the necessary knowledge to create both client and server processes and to create processes that can use a number of different communications types (data transfer mechanisms). The agent is also configured to be extensible, so that new communications types can be added to the Agent by just extending the interface provided for benchmarking.

Once the processes 6 have been created, the agent 5 waits for a signal from the manager 3 to start the measurement. Once this is received, the agent 5 starts the measurement at step S30, e.g. as mentioned above by notifying on an Object on which the processes 6 are waiting.

After the processes 6 have finished the data transfers, the agent component 5 determines the benchmarking results at step S32, and then sends the benchmarking results to the manager component 3 at step S34. For example, the agent components 5 may send back measurement data available at the client processes 6.

Other communications between the manager 3 and agents 5 are also possible, and the manager 3 may for example instruct an abort of the testing. Also, instead of the agents 5 automatically sending back the benchmark results to the manager 3, the manager 3 may instead poll the agents 5.

As will be appreciated, the manager component 3 and agent components 5 may be implemented in any suitable manner, depending on the languages and machines used. The parameters passed may also vary depending on the languages used and the transport mechanisms involved. These various possible implementations of the invention would be well understood by a person skilled in the art in the light of the present teachings.

As the reporting of the system is separated from the actual measurements by the agent components, the framework may easily be enhanced to include new kinds of transport mechanism without having to alter the user interface. Also, users do not need to concern themselves with the specific implementation of the benchmark tests, and can interact through the same interface for all of the different types of test. Both the Intra- and Inter-mode testing can be carried out using the same user interface, and the user can compare the results of the different messaging transport mechanisms with one another.

The repository of test scripts allows for the simple automating of repeat testing. For example, the manager component 3 may be invoked giving a configuration file name as a parameter which contains the names of the agents to use in the test, and, once these agents have been located (e.g. using CORBA), the manager may pass a script to each of the agents named.

It is to be understood that various alterations additions and/or modifications may be made to the parts previously described without departing from the ambit of the invention, and that, in the light of the teachings of the present invention, the present invention may be implemented in software and/or hardware in a variety of manners.

What is claimed is:

1. A system for testing data transfer between a plurality of process run on one or more nodes of network, the system including a central manager component, and an agent component associated with each of the nodes, wherein the manager component instructs the agent components to conduct data transfer test for messaging middleware, wherein the agent components create processes between which data is to be transferred based on instructions from the manager components and determine test results for the data transfer tests, and wherein the manager component receives the results of the tests from the agent components.

2. The system of claim 1, wherein the manager component is remote from the nodes between which the tests are conducted.

3. The system of claim 1, wherein the manager component communicates with the agent components using CORBA.

4. The system of claim 1, wherein the manager component passes control parameters to agent components involved in a test, and wherein said agent components create said processes based on said parameters.

5. The system of claim 4, wherein said parameters include a role parameter to indicate the role of a process.

6. The system of claim 4, wherein said parameters include a transfer mechanism parameter to determine which transfer mechanism a process is to use to transfer data.

7. The system of claim 4, wherein said parameters include a communications parameter to control the data transfer for the specific transfer mechanism involved.

8. The system of claim 4, wherein said parameters include benchmarking parameters to indicate the number of messages to be transferred and/or the size of the messages to be transferred.

9. The system of claim 1, wherein the manager component provides synchronising instructions to the agent components for starting said processes.

10. The system of claim 1, wherein on completion of said tests, said agent components send the results to the manager component.

11. The system of claim 10, wherein the manager component registers a callback with the agent components, which the agent components use to inform the manager component of the results after completion of the tests.

12. The system of claim 1, wherein said manager component polls said agent components for the results of said tests.

13. The system of claim 1, wherein the manager component computes a metric from the data transfer test results.

14. The system of claim 1, wherein data transfer takes place between processes running on at least two different nodes.

15. The system of claim 1, wherein data transfer takes place between processes running on the same node.

16. The system of claim 1, wherein data transfer takes place between a server process and a client process, and the manager component instructs the agent component of a node which is to exchange data as to whether to create a client or server process.

17. The system of claim 1, wherein the manager component stores test instructions in a script repository for the automated reproduction of tests.

18. A method for testing data transfer between a plurality of processes run on one or more nodes of a network, the method including the steps of:

providing a central manager component, and providing an agent component associated with each of the nodes, wherein the manager component instructs the agent components to conduct data transfer tests, the agent components create said processes between which data is to be transferred and determine test results for the data transfer tests, and the manager component receives the results of the tests from the agent components.

19. Computer software for testing data transfer between a plurality of processes run on one or more nodes of a network, the software including a manager component located on a machine remote from the node or nodes and an agent component associated with each of the nodes, wherein the manager component instructs the agent components to conduct data transfer tests, wherein the agent components create said processes between which data is to be transferred and determine test results for the data transfer tests, and wherein the manager component receives the results of the tests from the agent components.

20. A system for testing the performance of a plurality of data transfer mechanisms that provide messaging services for processes run on nodes of a communications network, the system including:

a central manager component for receiving user instructions for conducting performance tests and for providing reports on said tests; and agent components provided on said nodes of said network for creating client and server processes between which data is to be transferred during said tests, wherein said manager component sends parameter information to said agent components to instruct said agent components as to the types of processes to create and the types of data transfer mechanisms to employ during said tests, wherein said manager component synchronizes said agent components to start said tests, and receives performance results from said agent components, and wherein said agent components create client and server processes in accordance with parameter information received from said manager component, and provide performance results of data transfers between said processes to said manager component.

* * * * *